United States Patent [19]

Oskay et al.

[11] Patent Number: 5,642,337
[45] Date of Patent: Jun. 24, 1997

[54] NETWORK WITH OPTICAL MASS STORAGE DEVICES

[75] Inventors: Orhun Oskay, San Diego; Sanjay Kapoor, Del Mar; Phillip Hiroshige, Carlsbad, all of Calif.

[73] Assignees: Sony Corporation, Tokyo, Japan; Sony Electronics Inc., Park Ridge, N.J.

[21] Appl. No.: 709,668

[22] Filed: Sep. 9, 1996

Related U.S. Application Data

[63] Continuation of Ser. No. 404,029, Mar. 14, 1995, abandoned.
[51] Int. Cl.$^6$ .................................................. G11B 17/22
[52] U.S. Cl. .................................................................. 369/30
[58] Field of Search ........................................ 369/30, 34

[56] References Cited

U.S. PATENT DOCUMENTS

| | | | |
|---|---|---|---|
| 4,232,295 | 11/1980 | McConnell | 340/151 |
| 4,864,438 | 9/1989 | Munro | 369/34 |
| 4,945,429 | 7/1990 | Muro et al. | 369/34 |
| 5,164,909 | 11/1992 | Leonhardt et al. | 369/34 |
| 5,214,768 | 5/1993 | Martin et al. | 369/34 |
| 5,235,572 | 8/1993 | Tamai | 369/30 |
| 5,355,302 | 10/1994 | Martin et al. | 364/410 |
| 5,416,914 | 5/1995 | Korngiebel et al. | 369/34 |
| 5,438,674 | 8/1995 | Keele et al. | 395/404 |

OTHER PUBLICATIONS

"SPANStor–Opti Intelligence Controller" product brochure, manufacturered by Symmetrical Technologies of Herndon, VA, date of reference unknown, but known to be prior to the effective filing date of this application, Mar. 14, 1995.

"Net–JBI Network Jukebox Interface" product brochure by Ten X Technology, Inc. of Austin Texas, date of reference unknown, but known to be prior to the effective filing date of this, application, Mar. 14, 1995.

"SureStore Optical 20xt LAN Jukebox", product brochure by Hewlett Packard Company, date of reference unknown, but known to be prior to the effective filing date of this application, Mar. 14, 1995.

Fowler, Dennis, "Discport: Easy Access to Multiple CD–ROM Drives on a Server", PC–Computing, Nov. 1993, vol. 6, No. 11, p. 126 (1), pp. 1–3.

*Primary Examiner*—Frank G. Font
*Assistant Examiner*—Jason D. Vierra Eisenberg
*Attorney, Agent, or Firm*—Limbach & Limbach L.L.P.

[57] ABSTRACT

A storage system in which a plurality of optical or magneto-optical disk jukeboxes which operate on SCSI commands are intercoupled on a network so as to provide a virtually limitless mass storage system. A network server receives SCSI format commands, encodes them to the network format and places the commands on the network bus. A firmware interface unit at the jukebox containing the requested information receives the network format data and converts it back into SCSI format for processing at the jukebox. The jukebox retrieves the data, sends it back to the interface unit which encodes it into network format and sends it back onto the bus to the network server. The network server receives the data, decodes the data and forwards it to the client which requested the data.

20 Claims, 8 Drawing Sheets

NETWORK WITH OPTICAL MASS STORAGE DEVICES

This is a continuation of application Ser. No. 08/404,029 filed on Mar. 14, 1995 now abandoned.

FIELD OF THE INVENTION

The invention pertains to optical mass storage devices. More particularly, the invention pertains to optical mass storage devices capable of operating on a local area network.

BACKGROUND OF THE INVENTION

Optical and magneto-optical disks are capable of storing data very densely. A five inch diameter optical disk, can store approximately 1.2 gigabytes of data (one gigabyte per side). Accordingly, it is common to use optical and magneto-optical disks as storage devices for large collections of files, such as databases, image files and video files.

Devices which are commonly termed "jukeboxes" are available for use in optical disk database applications in which large amounts of data are stored on a plurality of optical disks. A jukebox includes a disk reproducing or recording/reproducing apparatus and a storage rack having a plurality of storage slots for storing a plurality of optical disks. Robotics are provided which are capable of removing a disk from any particular storage slot, transporting it to the reproducing apparatus, and inserting it into the reproducing apparatus. Thus, data on any one of the plurality of disks contained in the storage slots of the jukebox can be reproduced. In such a system, the jukebox would be coupled to a local computer which receives requests for data from a user at the computer or from remote clients over a network. The computer has a hard disk drive in which is stored a jukebox file system which is basically an index into the database stored on the jukebox. The application software, using the jukebox file system, processes the requests and identifies the file name and disk containing the requested information and generates commands to control the robotics and reproducing apparatus in the jukebox to retrieve the specified file.

A standardized protocol known as SCSI (Small Computer System Interface) is the most common protocol used in small computer interfacing systems. Accordingly, most peripheral devices, including jukeboxes, operate in accordance with SCSI protocol. Accordingly, the jukebox would be coupled to the workstation through a SCSI cable and the workstation would send SCSI format commands to the jukebox for controlling the jukebox's robotics and data reading operations to retrieve the requested data. The jukebox would send the data back to the computer for forwarding to the user/client.

A typical jukebox may have storage slots to accommodate 20 disks. Accordingly, such a jukebox would be able to provide access to approximately 26 gigabytes of information. If it is desired to have access to more than 26 gigabytes of information, there are several options.

First, one can purchase a jukebox with more slots. However, jukeboxes with capacity greater than 20 disks are expensive. As a jukebox user's capacity needs increase, he may replace his existing jukebox with a larger one, but he will lose his investment in the initial jukebox. Further, if and when the user outgrows any subsequently purchased jukeboxes, he will have to continuously replace the previous jukebox with increasingly more expensive jukeboxes with no use for the replaced jukebox.

Alternately, one can couple an additional jukebox to the workstation through a second SCSI interface. However, there are a limited number of SCSI peripherals which can be supported on the SCSI protocol. In particular, in the SCSI protocol, only 8 addressable peripherals are supported per SCSI interface module. Each jukebox requires three of those addresses, namely, one address for the robotics, and two addresses for data transfer operations. An additional address is needed for a SCSI controller. That leaves three addresses available. Accordingly, at best, one additional jukebox can be added. If the workstation has another peripheral device, such as a hard disk, then there is not even room for one more jukebox. One can add additional SCSI interface modules in order to support more jukeboxes. However, in addition to the above-noted problems, SCSI cables should not exceed 3 meters in length because of possible data loss due to noise on the cables. Even further, a user would not be able to access the data in different jukeboxes conveniently. The user would have to switch between peripherals (e.g., in DOS, he would have to change directories) in order to switch between jukeboxes.

As a further alternative, additional disks can simply be stored off line and, when data is required from those disks, they can be manually inserted into the jukebox.

Each of these options has significant limitations with respect to the amount of total data which can be made available on line within reasonable expense, with speedy data retrieval and without the need for human intervention.

Accordingly, it is an object of the present invention to provide an improved jukebox based data retrieval system.

It is a further object of the present invention to provide a jukebox data retrieval system with virtually limitless data capacity.

It is another object of the present invention to provide a turn-key jukebox which can be easily installed on an existing system when it is necessary to increase data storage capacity.

It is yet a further object of the present invention to provide a jukebox which can be coupled to a network.

It is yet another object of the present invention to provide a jukebox data retrieval system in which additional jukeboxes can be coupled to a network without the need for additional jukebox controllers for each additional jukebox.

SUMMARY OF THE INVENTION

According to the invention, a mass storage device comprises a master jukebox having a local computer and a plurality of slave jukeboxes intercoupled over a network to the local computer. All of the jukeboxes operate in SCSI protocol.

The master jukebox comprises a magneto-optic disk reproducing apparatus, a disk storage and retrieval system, and a slave SCSI controller for accepting SCSI commands from the local computer for operating the disk reproducing apparatus and the robotics of the storage and retrieval apparatus. The local computer includes a CPU, an initiator SCSI controller for sending commands to the slave SCSI controller of the master jukebox, and a network controller. A hard disk drive also is provided which has stored in it a jukebox file system which the CPU can access to determine the location of requested data.

The CPU receives a data request, processes it to determine the jukebox, disk and file responsive to the request and generates SCSI commands for the disk storage and retrieval system and/or the magneto-optic disk reproducing apparatus of the designated jukebox for retrieving the data. If the jukebox identified as the one containing the requested data is the master jukebox, the CPU sends the SCSI commands to the initiator SCSI controller, which forwards commands to the master jukebox's slave SCSI controller. However, if the requested data is on another jukebox, the CPU encodes the SCSI commands in accordance with the protocol of the network and transmits the request through the network controller onto the network.

Each slave jukebox includes a firmware interface unit for intercepting network data packets containing encoded SCSI commands intended for the associated slave jukebox, decoding the SCSI commands contained in the data packets, forwarding the SCSI commands to the associated slave jukebox, receiving data from the jukebox responsive to the request, encoding the retrieved data into one or more data packets in accordance with the network protocol, and sending the data out on the network back to the computer. The computer at the master jukebox then returns the requested data to the client (or user) that requested the data.

The slave interface unit includes a CPU for running software for receiving and for extracting the SCSI commands from the network protocol data packets received over the network and for receiving data retrieved from a disk and encoding it into network protocol data packets. It also includes a non-volatile memory, preferably an EPROM, for storing the instruction set for running the conversion routines. Further, it includes a random access memory, preferably a DRAM, for data buffering purposes between the network and the jukebox SCSI controller. In addition, it includes its own separate initiator SCSI controller for communicating with the slave jukebox's slave SCSI controller and a network controller for interfacing with the network.

The computer at the master jukebox includes a CPU for running software for (1) receiving data requests, and determining the jukebox, disk and file responsive to the request, (2) determining which jukebox to send the request to, (3) encoding the SCSI commands into network data packets, if it is a slave jukebox, (4) sending the commands to the appropriate destination (the master jukebox or the network), (5) receiving returned data responsive to the data request (from the master jukebox or over the network), (6) decoding it, if from the network, and (7) returning the data to the requester. It also includes a non-volatile memory, preferably an EPROM, for storing instructions for running software for performing the above-noted task. Further, it includes a random access memory, preferably a DRAM, for data buffering purposes between the network and the CPU. In addition, it includes an initiator SCSI controller for communicating with the master jukebox's slave SCSI controller as well as a network controller for interfacing with the network.

In operation, a client sends a data request to the master jukebox. The CPU consults the jukebox file system to determine the location of the requested data and retrieves a three part descriptor which indicates (1) the ID of the jukebox which contains the data, (2) the ID of the disk in that jukebox which contains the data, and (3) the name of the file on that disk with the desired data. If the requested data is contained in a file on a disk in the master jukebox, the requested data is retrieved using normal SCSI commands. However, if the jukebox ID is that of another jukebox, i.e., a slave jukebox, the CPU encodes the SCSI commands in accordance with the network format and forwards them on the network to the destination jukebox. The network interface unit at the destination slave jukebox recognizes its ID and intercepts the request, retrieves that data previously described and sends it back to the master jukebox. The master jukebox returns the data to the user/client.

DETAILED DESCRIPTION OF A PREFERRED EMBODIMENT OF THE PRESENT INVENTION

Figure 1:
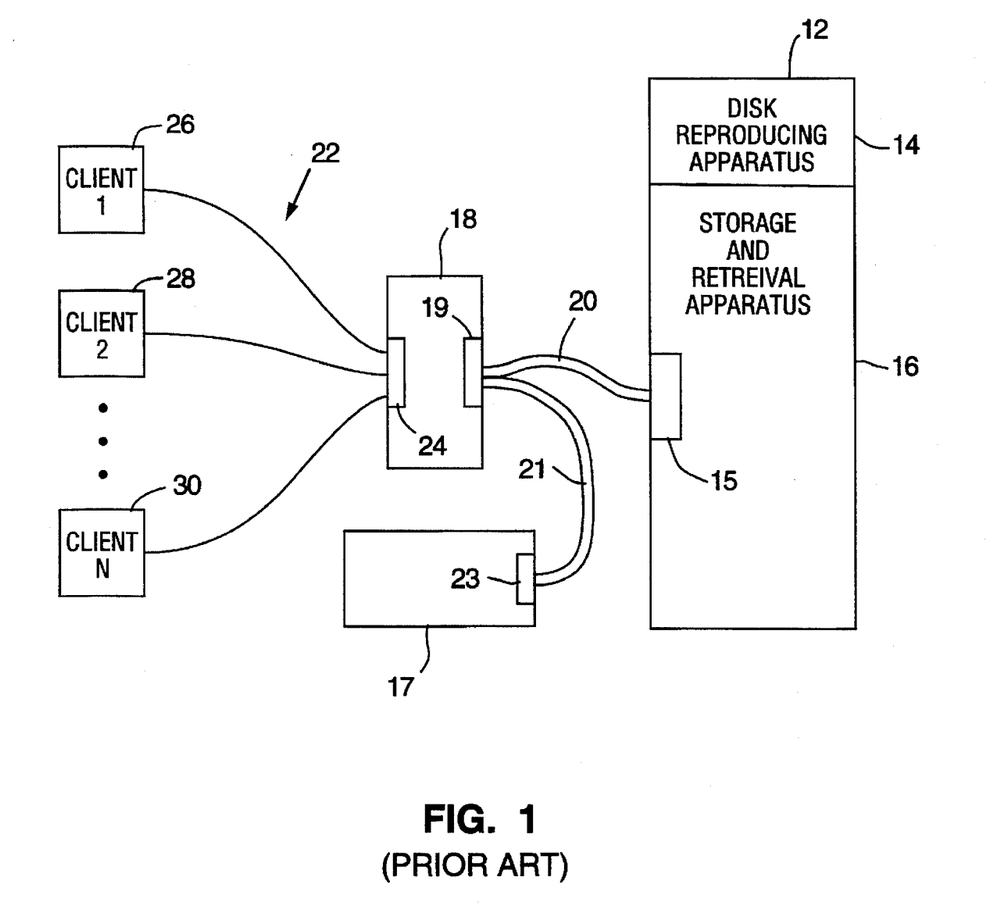
FIG. 1 is a block diagram of a jukebox of the prior art accessible to a plurality of client/users over a network.

FIG. 1 illustrates a jukebox of the prior art which is accessible through computer 18 by a plurality of clients coupled to a network. Particularly, a jukebox 12 includes a disk reproducing apparatus 14, a disk storage and retrieval apparatus 16 for storing a plurality of optical and/or magneto-optical disks containing data and a slave SCSI controller 15 for receiving SCSI commands over SCSI cable 20 and causing apparatus 14 and 16 to operate in accordance with the received commands. The computer 18 is further coupled to a network, such as an Ethernet network 22, through an Ethernet interface 24. A plurality of clients 26, 28 and 30 can communicate with computer 18 over the network 22 in order to request data from the disks in jukebox 12. The computer 18 receives data requests from the clients at interface 24, and retrieves a file name and disk number from the jukebox file system stored on hard disk drive 17 through initiator SCSI controller 19, cable 21 and slave SCSI controller 23. Computer 18 then formulates a series of commands to control the disk reproducing apparatus 14 and storage and retrieval apparatus 16 of the master jukebox for accessing the data which has been requested. The computer 18 sends the commands to a SCSI controller 19 which sends the commands to the jukebox over SCSI cable 20. The transmission to the jukebox includes (1) commands to the disk reproduction apparatus for reading the appropriate data file off the disk and/or (2) commands for controlling the robotics in the jukebox 12 for retrieving the appropriate disk and inserting it into the disk reproduction apparatus 14. The jukebox executes the commands and returns the accessed data through jukebox SCSI controller 15, SCSI cable 20 and computer SCSI controller 19. The computer 18 then packetizes the information into Ethernet format and returns the retrieved data to the requesting client through Ethernet interface 24 and network 22.

Figure 2:
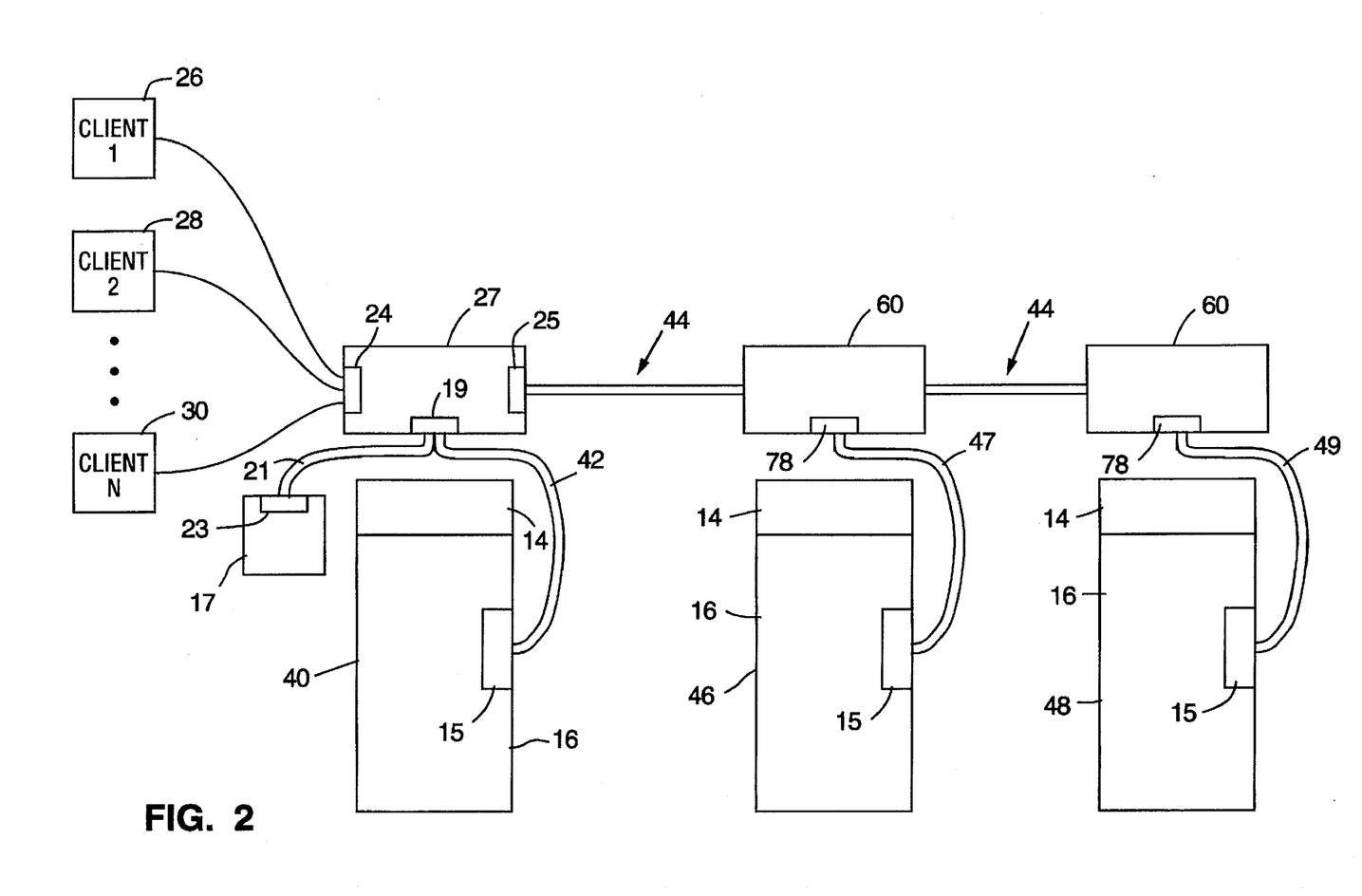
FIG. 2 is a block diagram of a network database system in accordance with the present invention.

Referring now to FIG. 2, which broadly shows a fiber channel network of jukeboxes in accordance with the present invention, the communication between clients as illustrated by clients and the computer, remains essentially the same as described above with respect to FIG. 1. In the present invention, a master jukebox 40 is coupled to a computer 27 through a SCSI connection 42, much as described above with respect to prior art FIG. 1. However, the computer 27 according to the present invention includes additional hardware and software and is coupled over a second network 44 to one or more slave jukeboxes 46 and 48. For purposes of illustration, the second network 44 is assumed to be an Ethernet protocol network, however, it should be understood that any type of network can be utilized with the present invention.

Figure 3:
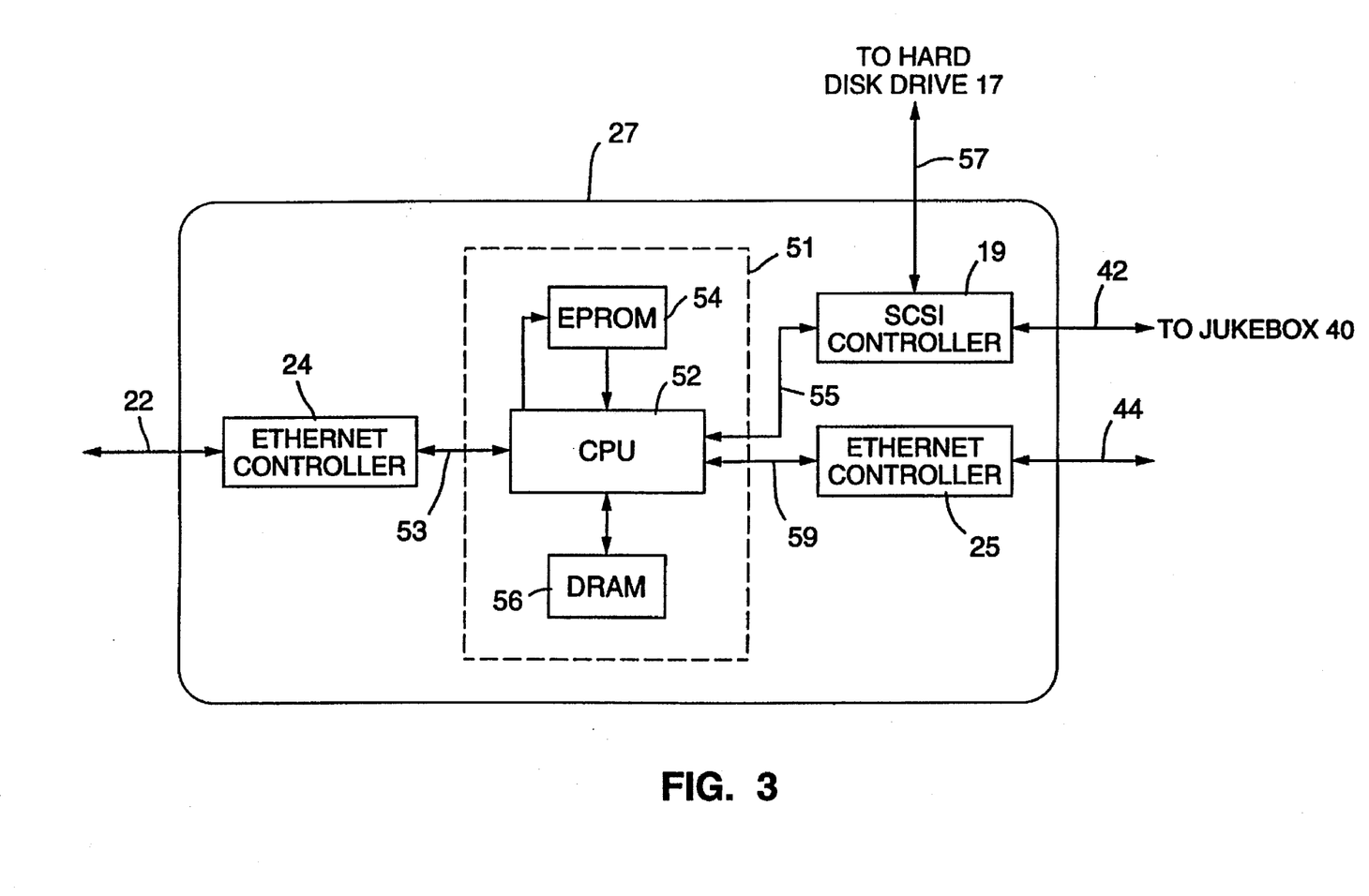
FIG. 3 is a more detailed block diagram of a master interface unit in accordance with the present invention as illustrated in FIG. 1.

In the present invention, the descriptor used in the jukebox file system has an additional field so as to identify not only the file name and disk containing the requested data but also the jukebox containing the disk having the requested data. The application software in computer 27 also differs in that it includes a routine for observing the jukebox ID of the descriptor and processing data differently depending on the jukebox ID. Particularly, computer 27 generates SCSI commands for operating the robotics in storage and retrieval apparatus 16 and/or the magneto-optical drive of the reproducing apparatus 14 of the jukebox to retrieve the data regardless of whether the data is contained within the master jukebox or one of the slave jukeboxes. If the jukebox ID identified the master jukebox, the commands are sent to the SCSI controller 19 and processed by the master jukebox 40 as in the prior art. However, if the jukebox ID identified a slave jukebox, the computer 27 encodes the SCSI commands into network data packets and sends them out to network 44 through a second network controller 25. The computer 27 also receives returning data from the master jukebox's SCSI controller or over the network from the slave jukebox which contained the requested data, decodes the network data packets back into SCSI format (if the data is received over the network) and forwards it to the requesting client through the first network controller FIG. 3 is a block diagram of computer 27. It comprises a processing section 51 having a CPU 52, an EPROM 54 for storing the software for performing the above-discussed functions, and a DRAM which may be used for data buffering between network 22, network 44, jukebox 40 and hard disk drive 17. There also is an Ethernet controller 24 for interfacing with network 22 and a second Ethernet controller 25 for interfacing with network 44. Alternately, a single Ethernet controller may be employed to interface with both networks. Finally, there is a SCSI controller 19 for interfacing with the hard disk drive 17 and the jukebox 40.

Processing section 51 performs the following tasks: (1) receiving data requests over network 22, (2) decoding the network data packets, (3) looking up and retrieving the location descriptor of the data requested by accessing the jukebox data file system on hard disk drive 17, (4) generating a series of SCSI commands for controlling the apparatus 14 and/or 16 of the jukebox identified as containing the data to cause the identified file to be reproduced, (5) encoding the data into network data packets for network 44, if the data is located on a slave jukebox, (6) transmitting the data packets on the network (if the data is located on a slave jukebox) or transmitting the SCSI commands to the master jukebox (if the data is located in the master jukebox), (7) receiving the data responsive to the request, (8) decoding that data, if it is received over the network, and (9) returning the data to the requesting client.

Thus, data requests are received through Ethernet controller 24 and sent to CPU 52 over connection 53. CPU 52 decodes the network data packets to extract the data request. CPU 52 then formulates SCSI commands for hard disk drive 17 to retrieve a descriptor and forwards those commands to SCSI controller 19 through connection 55. SCSI controller 19 forwards the commands to a hard disk drive 17 over connection 57. A descriptor is returned to SCSI controller 19 over connection 57 and is forwarded back to CPU 52 over connection 55. CPU 52 reads the jukebox ID portion of the descriptor. If the jukebox ID identifies the master jukebox, CPU 52 formulates SCSI commands for operating the reproducing apparatus 14 and storage and retrieval apparatus 16 in master jukebox 40 for retrieving the identified data. The CPU sends these commands over connection 55 to SCSI controller 19 and, therethrough, to jukebox 40 over SCSI cable 42. When jukebox 40 returns the data over cable 42 to SCSI controller 19, CPU 52 reads the data over connection 55, encodes it into appropriate data packets and forwards it to Ethernet controller 24 over connection 53. The data is then sent out on network 22 to the requesting client.

If the jukebox ID identifies a slave jukebox, CPU 52, generates SCSI commands for controlling the apparatus 14 and 16 of the identified jukebox, However, instead of forwarding the SCSI commands to SCSI controller 19, it encodes the SCSI commands into network data packets in accordance with the protocol of network 44 and sends those data packets to Ethernet controller 25 over connection 59. Ethernet controller 25 places the data packets onto network 44.

When data is returned from a slave jukebox over network 44 responsive to this request, Ethernet controller 25 intercepts the data and forwards it to CPU 52 over lines 59. CPU 52 decodes the data packets and re-encodes them into the data packet protocol of network 22 and forwards the re-encoded data packets to Ethernet controller 24 over lines 53. The data is then placed on the network 22 to be returned to the requesting client.

DRAM 56 may be used for data buffering for any of these operations, particularly with respect to the decoding and encoding of the returning data.

Figure 4A:
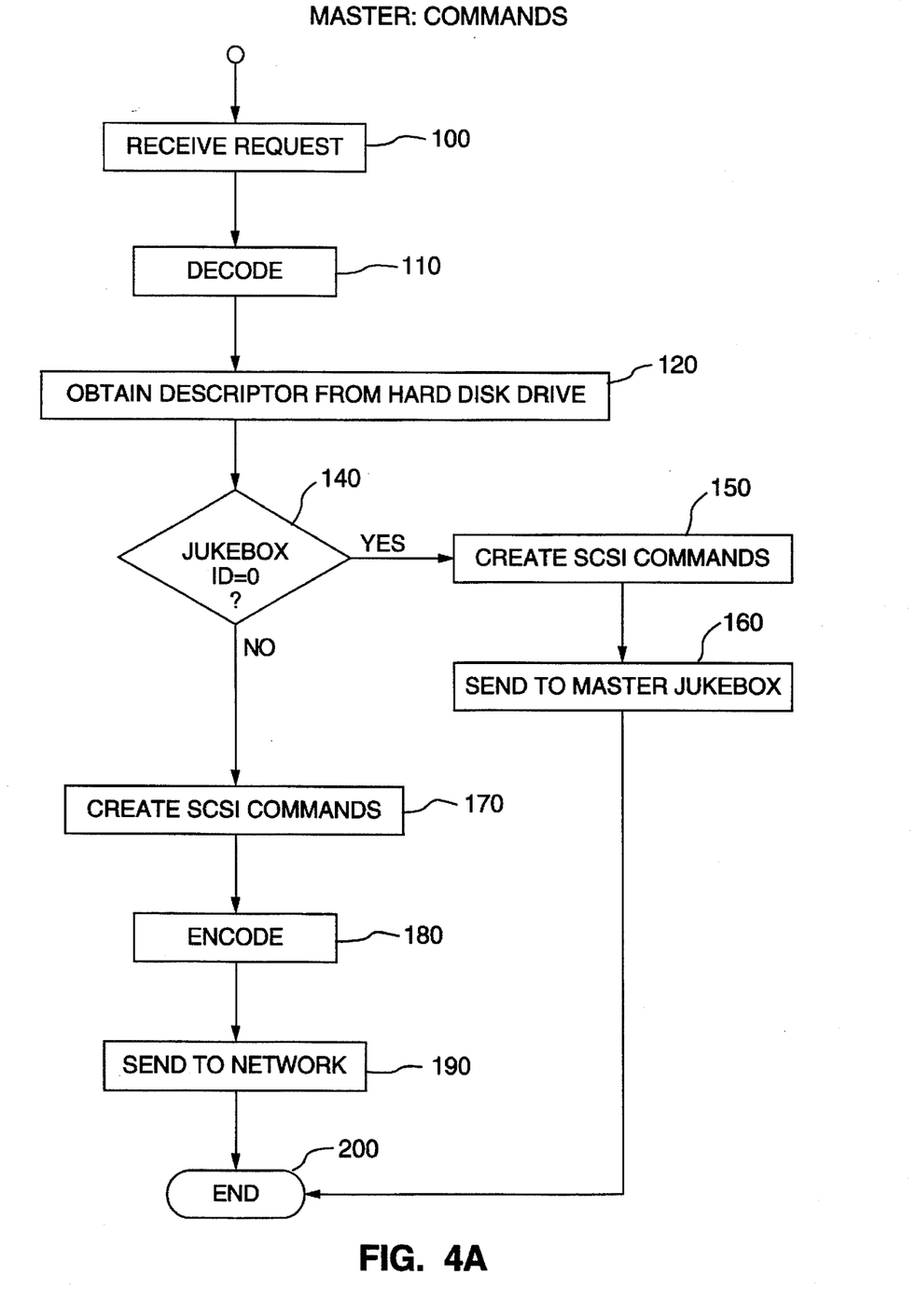
FIGS. 4A and 4B are flow charts illustrating exemplary routines performed by the CPU of the computer in accordance with the present invention.

FIG. 4A is a flow chart illustrating the processing steps performed by the computer 27 when it receives a data request. In step 100, the CPU 52 receives a data request over network 22. In step 110, it decodes the request. In step 120, it formulates and sends SCSI commands for retrieving the appropriate descriptor from the jukebox file system in hard disk drive 17 and waits for the descriptor to be returned from hard disk drive 17. When returned, processing proceeds to step 140. In step 140, it observes the jukebox ID and, if the jukebox ID identifies the master jukebox, processing flows to step 150. In step 150, CPU 52 generates the SCSI commands for causing a jukebox to retrieve the specified data. In step 160, that data is sent to the master jukebox and the routine ends at step 200.

If the jukebox ID identified any other jukebox, programming flows from step 140 to step 170, where the CPU 52 generates SCSI commands for operating the particular slave jukebox to retrieve the specified data. In step 180, the CPU 52 encodes the data into network data packets in accordance with the protocol of network 44. In step 190, it sends the packets out on the network, at which point the routine ends at step 200. DRAM 56 may be used in data buffering in any of steps 100, 110, 170, 180 and 190.

Figure 4B:
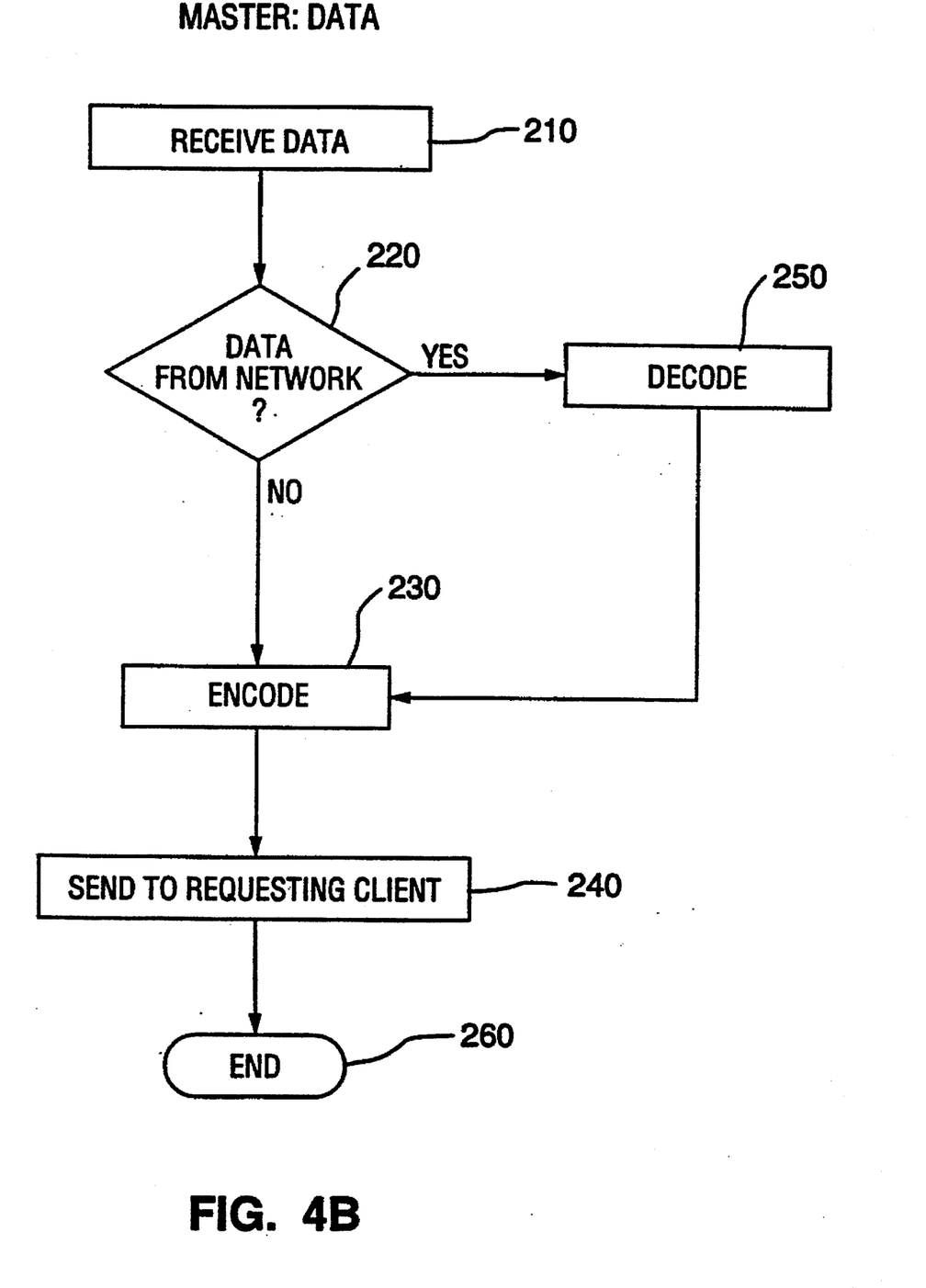

FIG. 4B is a flow-chart illustrating the programming steps performed by computer 27 upon receipt of requested data in response to the routine shown in FIG. 4A. The routine illustrated in FIG. 4B is entered, for instance, when CPU 52 receives an interrupt from network controller 25 indicating that data has been received over the network intended for computer 27 or when it receives an interrupt from SCSI controller 19. However, other methods for initiating the routine illustrated in FIG. 4B responsive to the receipt of data from a jukebox would be obvious to a person of skill in the art.

As shown, in step 210, the processor receives the data, either through its SCSI controller from the master jukebox or from its Ethernet controller from a slave jukebox. DRAM 56 may be used for data buffering purposes at this point. In step 220, if the data is from the SCSI controller, it is encoded to the data packet protocol of network 22 of step 230. Finally, in step 240, the data is returned to the requesting client.

If, in step 220, the data was received from a slave jukebox, processing flows to step 250 in which the data packets are decoded. Processing then flows to step 230 where the data packets are re-encoded into the format of network 22. Processing then flows to step 240 as previously described and the routine is ended at step 260. DRAM 56 may be used for data buffering purposes in any of steps 210, 230 and 250.

Figure 5:
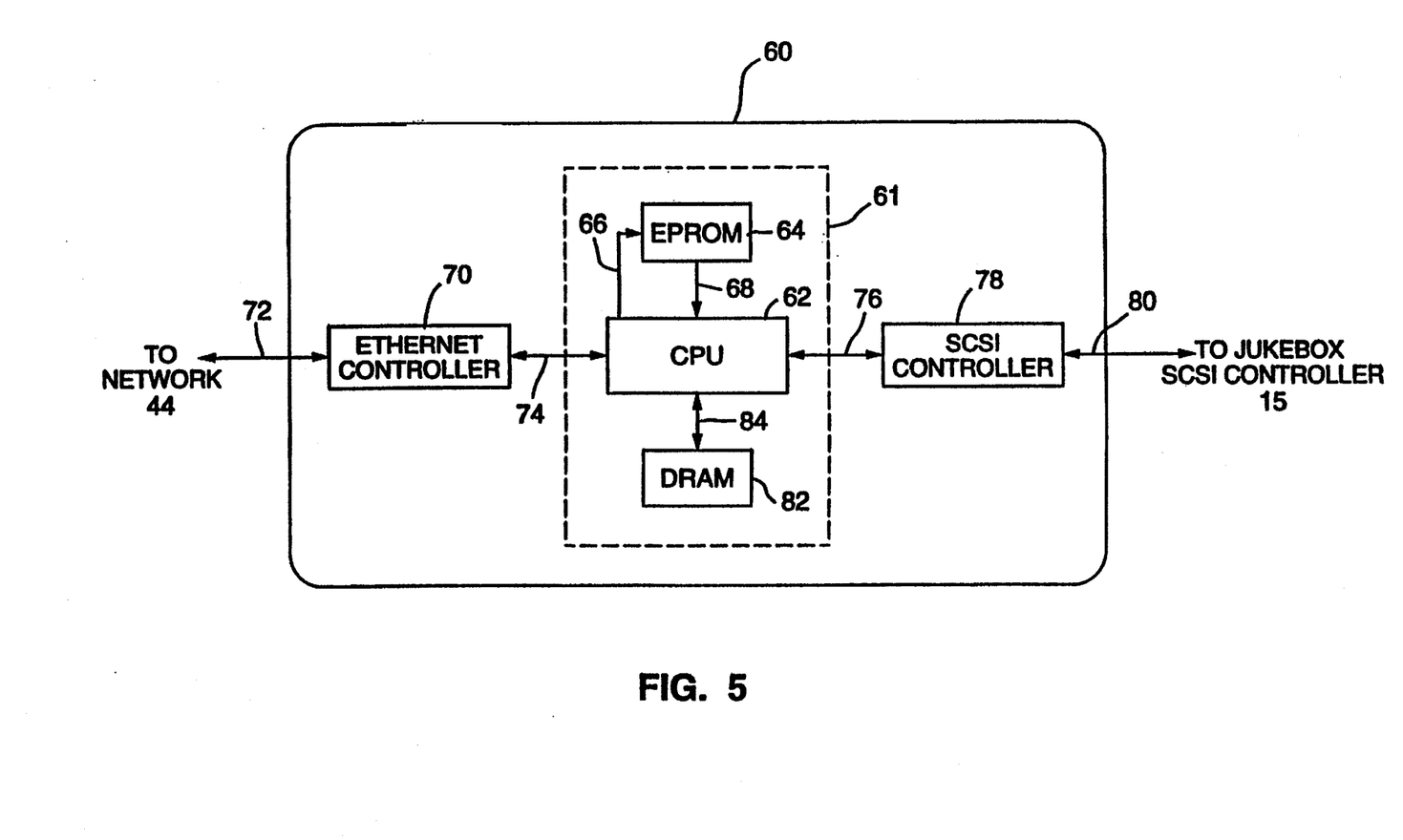
FIG. 5 is a more detailed block diagram of a slave interface unit in accordance with the present invention as illustrated in FIG. 1.

Slave jukeboxes 46 and 48 also may be essentially identical to jukebox 12 of the prior art with the addition of a slave interface unit 60, as illustrated in FIG. 5. Particularly, slave jukeboxes 46 and 48 include a disk reproducing apparatus 14 for reproducing data from an optical or magneto-optical disk, a storage system 16 for storing a plurality of disks as described above with respect to jukebox 12 of FIG. 1 and a SCSI controller 15 for receiving and executing SCSI commands to operate the disk reproducing apparatus 14 and the storage system 16.

FIG. 5 illustrates the slave interface unit 60 associated with each of the slave jukeboxes 46 and 48 in accordance with the present invention. The controller 60 can be included within the jukeboxes 46 and 48, or, more preferably, comprises a peripheral unit as illustrated in FIG. 5.

The additional tasks to be performed locally at each slave jukebox 46 and 48 by interface unit 60 include (1) intercepting network format data packets intended for that particular jukebox, (2) decoding the SCSI commands contained within the network format data packets, (3) interfacing with the SCSI controller in the jukebox to send it the decoded SCSI commands, (4) receiving the data retrieved by the disk reproducing apparatus, (5) encoding that data into one or more network format data packets, and (6) placing the data on the network to be returned to the master jukebox.

Accordingly, slave interface unit 60 includes a processing section 61 which has a CPU 62 for running the software needed to perform the functions described above. The actual code for performing these functions would be obvious to a person of ordinary skill in the related arts and is not discussed in detail herein. An EPROM or other non-volatile memory 64 is provided in processing section 61 for storing instruction code comprising the software for performing the above-noted functions. The CPU 62 sends addresses to EPROM 64 on address lines 66 and receives instructions into its data register through line(s) 68.

An Ethernet controller 70 interfaces with the network through link 72. In particular, Ethernet controller 70 intercepts network packets intended for the associated jukebox from the network 44 and forwards them to the CPU 62 on link 74. CPU 62 decodes the SCSI commands contained in the data packet(s) and forwards them on link 76 to SCSI controller 78. The SCSI controller 78 forwards the commands on link(s) 80 to the local jukebox SCSI controller. The commands are executed in the jukebox such that the specified data is read off of the specified disk. That data is then returned on link 80 to SCSI controller 78 and therefrom on link 76 to the CPU 62. CPU 62 causes the data to be stored in a random access memory in processing section 61, such as DRAM 82 via link 84. When all of the returned data is stored, it is read back out over link 84 to the CPU 62. The CPU encodes the data in accordance with Ethernet protocol and sends it to Ethernet controller 70 over link 74 for further transmission out on to network 44. The computer 27 at the master jukebox 40 will receive and decode the data. It will then re-encode the data for transmission on the separate network 22 to the client that requested the data.

DRAM 82 is used for data buffering purposes. If the CPU 62 is sufficiently fast, it may not be necessary at all. However, if the computer is slow, it may be needed for data buffering for any of the data being exchanged, including commands received over the network or data retrieved from a disk, including both the original data or the data after it is encoded into network data packets.

It should also be understood that the network 22 through which the clients are coupled to the computer 27 and the network 44 through which the slave jukeboxes are coupled to the computer 27 may be the same physical network or different networks. Although they may be the same physical network, it should be understood that the clients can not communicate with the slave jukeboxes or vice versa except through computer 27. If networks 22 and 44 are different networks, they may use the same protocol, e.g., Ethernet, or different protocols.

Figure 6:
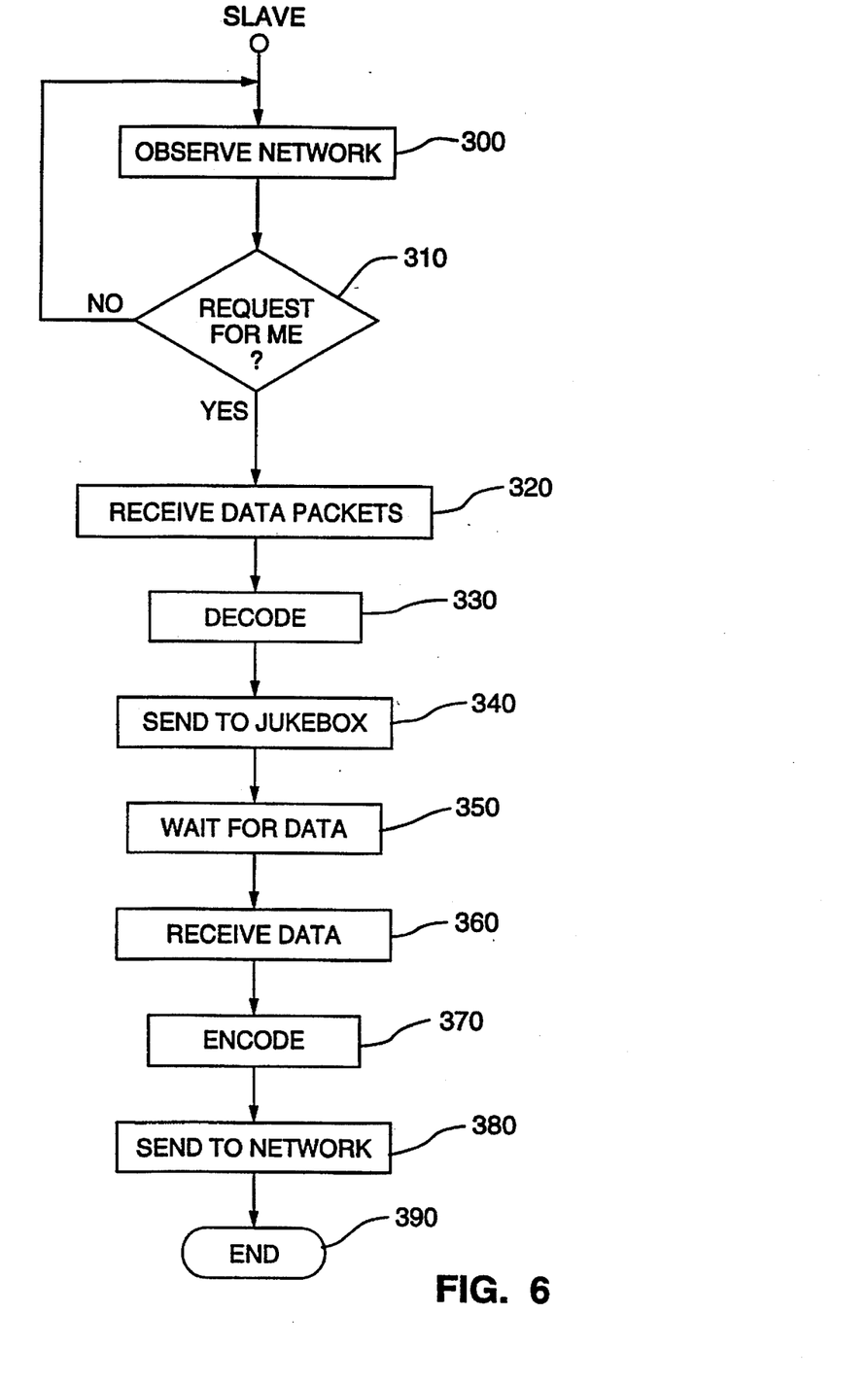
FIG. 6 is a flow-chart illustrating exemplary steps performed by the slave interface unit in accordance with the present invention.

FIG. 6 is a flow chart illustrating the steps performed by the CPU of the slave interface unit in accordance with the present invention. In step 310, the CPU waits for an interrupt from the network controller. (The network controller observes the network, looking for data packets intended for it and issues an interrupt to the CPU when it detects such data on the network). When it receives such a interrupt, processing proceeds to step 320 and 330 where the packet or packets are received and decoded to retrieve the SCSI commands contained therein. In step 340 it sends the SCSI commands to the associated jukebox. It then waits, in step 350, for the jukebox to retrieve the data and return it. When the data is received from the jukebox, in step 360, programming flows to step 370 where the data is encoded to network packets in accordance with the protocol with the network 44. In step 380, the slave interface unit sends the data packets out onto the network, whereupon the routine ends at step 390.

Figure 7:
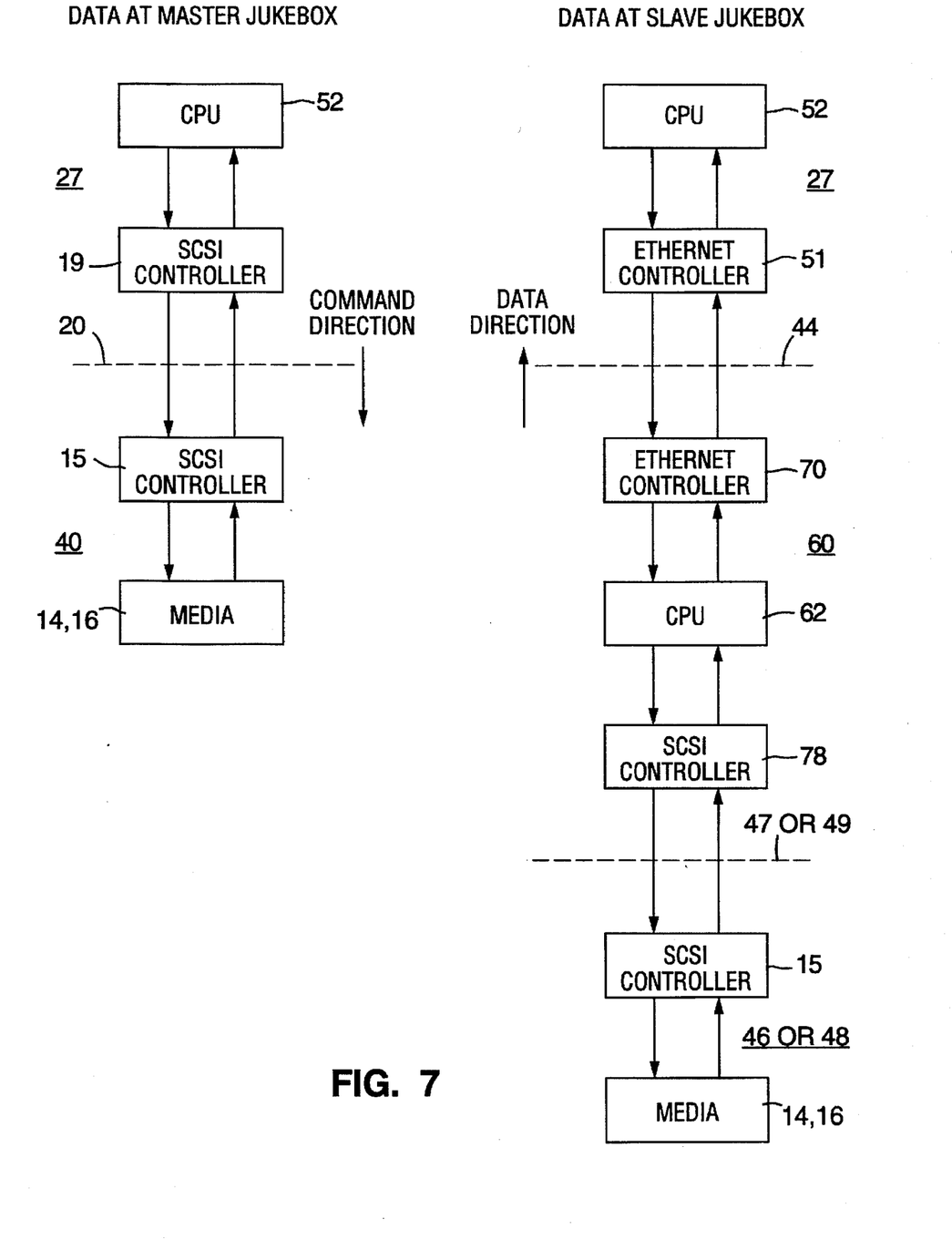
FIG. 7 is a data flow diagram in accordance with the present invention.

FIG. 7 is a diagram showing data flow in accordance with the present invention. In a system, according to the present invention, the descriptor portion of the data request includes a field in addition to the file name field (which identifies the file containing the requested data) and the media ID field (which identifies the slot or disk containing the identified file). This additional field, termed the jukebox ID field, identifies which one of the jukeboxes (including the master jukebox and all slave jukeboxes) has the disk and file identified in the other descriptor fields.

Referring to FIG. 7, computer 27 reads the jukebox ID field of the descriptor. If the jukebox ID identifies the master jukebox, the CPU 52 forwards the data request to the SCSI controller 19 of the computer 18 which interfaces with the local SCSI controller 15 of the jukebox. The master jukebox's SCSI controller 15 drives the robotics of the storage system 16 and data reproducing apparatus 14 to read the data from the appropriate disk and return it to the local SCSI controller 15. The data is then returned to the CPU 52. The CPU will return it to client as in the prior art (path not shown in FIG. 7).

If the jukebox ID identifies any jukebox other than the master jukebox, the data is encoded by CPU 52 and sent to the second Ethernet controller 51. The Ethernet controller sends it out on the network 44. The Ethernet controller 70 of the appropriate slave jukebox receives the encoded request. The CPU 62 decodes the request and sends it to SCSI controller 78. SCSI controller 78 interfaces with the jukebox SCSI controller 15 over SCSI interface 47 or 49, for example to cause the jukebox apparatus 14 and 16 to read the requested data off of the appropriate disk and send it back to SCSI controller 78. It is then forwarded to CPU 62 which encodes the data in accordance with Ethernet protocol and forwards it to Ethernet controller 70 where it is returned on network 44 to the master jukebox Ethernet controller 51. That Ethernet controller 51 forwards the data to the CPU 52 for decoding. Computer 27 then sends the data back to the requesting client as described above with respect to the prior art (not shown in FIG. 7).

The data paths illustrated in FIG. 7 are transparent to computer 27 and clients 26, 28 and 30. The present invention allows any standard SCSI jukebox to be easily modified to have the ability to be networked with other jukeboxes to provide a data base size which is virtually limitless. One jukebox is selected as the master jukebox and can be modified in accordance with the invention by adding a peripheral or embedded card in accordance with the circuitry shown in FIG. 3. One or more additional standard jukeboxes can be modified to be slave jukeboxes in accordance with the present invention by the addition of the circuitry illustrated in FIG. 5.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A data storage and retrieval system comprising;
   a network having a network protocol communication scheme,
   a computer having a central processing section, a SCSI controller, and a network controller coupled to the network, the computer receiving requests for data stored in the data storage and retrieval system,
   a master jukebox having a first plurality of media for storing data, a data reproducing apparatus for reproducing data stored on any of the media, and a SCSI controller coupled to communicate with the SCSI controller of the computer,
   a slave jukebox having a second plurality of media for storing data, a data reproducing apparatus for reproducing data stored on any of the media, and a SCSI controller,
   a slave interface unit having a central processing section, a SCSI controller coupled to the SCSI controller of the slave jukebox, and a network controller coupled to the network, and
   processing means within the central processing section of the computer for determining whether data responsive to a data request is on a medium located in the master jukebox or the slave jukebox, for formulating SCSI commands for causing the master or slave jukebox within which the responsive data is located to reproduce the data, for encoding the SCSI commands in accordance with the network protocol if the data is on a medium located in the slave jukebox, and for sending the instructions to the jukebox within which the responsive data is located.

2. A data storage and retrieval system as set forth in claim 1 wherein the processing means further comprises means for encoding the SCSI commands into data packets in accordance with the protocol and sending the packets to the network controller for transmission over the network to the slave jukebox.

3. A data storage and retrieval system as set forth in claim 2 further comprising a hard disk drive coupled to the computer, the hard disk drive comprising a file system for determining the location of data responsive to a request.

4. A data storage and retrieval system as set forth in claim 3 wherein the processing means further comprises means for sending the commands to the SCSI controller of the computer for transmission to the master jukebox SCSI controller, when the responsive data is located on a medium in the master jukebox.

5. A data storage and retrieval system as set forth in claim 4 wherein the file system on the hard disk drive represents the location of responsive data with a descriptor, the descriptor comprising a jukebox ID indicating the jukebox containing the responsive data, a disk ID indicating the disk in that jukebox containing the responsive data, and the name of the file on the disk within which the responsive data is located.

6. A data storage and retrieval apparatus as set forth in claim 5 wherein the network controller of the computer comprises means for receiving over the network responsive data from a slave jukebox and wherein the SCSI controller of the computer comprises means for receiving responsive data from the SCSI controller of the master jukebox and wherein the central processing section further comprises means for decoding the responsive data, if it is received over the network from a slave jukebox.

7. A data storage and retrieval apparatus as set forth in claim 6 wherein the computer receives the requests from a client over a communication channel and returns the responsive data to the client over the communication channel.

8. A data storage and retrieval apparatus as set forth in claim 7 wherein the central processing section of the slave interface unit comprises means for decoding network protocol encoded SCSI commands received over the network and sending them to the SCSI controller of the slave interface unit for transmission to the SCSI controller of the slave jukebox.

9. A data storage and retrieval apparatus as set forth in claim 8 wherein the SCSI controller of the slave interface unit further receives responsive data from the SCSI controller of the slave jukebox and wherein the central processing section of the slave interface unit further comprises means for encoding the responsive data into data packets in accordance with the network protocol and sending the data packets to the network controller of the slave interface unit for transmission over the network to the computer.

10. A data storage and retrieval apparatus as set forth in claim 9 wherein the slave jukebox comprises a plurality of slave jukeboxes, each having an associated slave interface unit.

11. A data storage and retrieval apparatus as set forth in claim 10 wherein the central processing section of the computer comprises a central processing unit, an instruction memory for storing software for running the central processing unit and a random access memory for data buffering.

12. A data storage and retrieval apparatus as set forth in claim 11 wherein the central processing section of the slave interface unit comprises a central processing unit, an instruction memory for storing software for running the central processing unit and a random access memory for data buffering.

13. A data storage and retrieval apparatus as set forth in claim 11 wherein the disks are optical disks.

14. A data storage and retrieval apparatus as set forth in claim 13 wherein the disks are magneto-optical disks.

15. A method for storing and retrieving data from a data storage and retrieval system, the system comprising a plurality of disks contained in a plurality of jukeboxes intercoupled over a network, a computer which receives requests for data stored in the data storage system, a master jukebox coupled to the computer through an SCSI protocol connection and having a first plurality of media for storing data, a slave jukebox having a second plurality of media for storing data, and a slave interface unit coupled to the slave jukebox through a SCSI protocol connection and also coupled to the network, the method comprising the steps of;

(1) receiving a request from a client for data stored in the data storage and retrieval system, (2) determining which of the disks contains the requested data, and which of the jukeboxes contains that disk, (3) creating a SCSI command for operating the jukebox which contains the disk identified in step (2) to reproduce the requested data, (4) encoding the SCSI command into a data packet in accordance with a protocol of the network, if the disk identified in step (2) is located in the slave jukebox, (5) sending the command to the jukebox identified in step (2), (6) receiving data responsive to the request from the jukebox identified in step (2), (7) if the data received in step (5) is received from the slave jukebox, decoding the data, and (8) transmitting the decoded data to the client.

16. A method as set forth in claim 15 wherein step (2) comprises the steps of;

(2.1) retrieving a descriptor of the location of the responsive data, the descriptor comprising a jukebox ID, a disk ID and a filename.

17. A method as set forth in claim 16 further comprising the step of;

(3.1) reading the jukebox ID to determine if the responsive data is located at the master jukebox or the slave jukebox.

18. A method as set forth in claim 17 wherein said slave jukebox comprises a plurality of slave jukeboxes, each having a slave interface unit associated therewith and wherein step (3.1) comprises;

(3.1.1) reading the jukebox ID to determine which of the master jukebox and the plurality of slave jukeboxes contact the responsive data.

19. A slave interface unit for coupling to a slave jukebox in a data storage and retrieval system, the system comprising a plurality of disks contained in a plurality of jukeboxes intercoupled over a network, a computer which receives requests for data stored in the data storage system, a master jukebox coupled to the computer over a SCSI protocol connection and having a first plurality of media for storing data, and a slave jukebox having a second plurality of media for storing data and a SCSI controller, the slave interface unit comprising;

a central processing section, a SCSI controller coupled to the SCSI controller of the slave jukebox, a network controller coupled to the network, means within the network controller for receiving over the network a network protocol encoded data packet containing a SCSI command intended for the associated slave jukebox and forwarding it to the central processing section, means within the central processing section for decoding the network encoded data packet to retrieve the SCSI command, means within the central processing section for transmitting the SCSI command to the SCSI controller for further transmission to the SCSI controller of the associated slave jukebox, means within the central processing section for waiting for and receiving responsive data returned to the interface's SCSI controller from the slave jukeboxes SCSI controller, means within the central processing section for encoding the responsive data into network encoded data packets, and means within the central processing section for transmitting the encoded responsive data to the network controller for transmission to the computer over the network.

20. A method for retrieving data from a slave jukebox of a data storage and retrieval system comprising a plurality of disks contained in a plurality of jukeboxes intercoupled over a network, a computer which receives requests for data stored in the data storage system, one of said jukeboxes being a master jukebox coupled to the computer over a SCSI protocol connection and having a first plurality of media for storing data, and one of the jukeboxes being a slave jukebox having a second plurality of media for storing data, and a slave interface unit coupled to the slave jukebox through a SCSI protocol connection and also coupled to the network through a network protocol connection, said method comprising the steps of;

receiving a network protocol encoded data packet containing a SCSI command intended for the associated slave jukebox over the network, decoding the network encoded data packet to retrieve the SCSI command, transmitting the SCSI command to the associated slave jukebox, waiting for and receiving responsive data from the associated slave jukebox, encoding the responsive data into data packets in accordance with the network protocol, and transmitting the encoded responsive data to the computer over the network.

* * * * *